United States Patent
Popovic et al.

(10) Patent No.: US 7,212,628 B2
(45) Date of Patent: May 1, 2007

(54) ECHO CANCELLATION/SUPPRESSION AND DOUBLE-TALK DETECTION IN COMMUNICATION PATHS

(75) Inventors: Mirjana Popovic, Ottawa (CA); Dieter Schultz, Dunrobin (CA)

(73) Assignee: Mitel Networks Corporation (CA)

( * ) Notice: Subject to any disclaimer, the term of this patent is extended or adjusted under 35 U.S.C. 154(b) by 382 days.

(21) Appl. No.: 10/765,465

(22) Filed: Jan. 26, 2004

(65) Prior Publication Data
US 2004/0247111 A1 Dec. 9, 2004

(30) Foreign Application Priority Data
Jan. 31, 2003 (GB) .................. 0302219.1

(51) Int. Cl.
*H04M 9/08* (2006.01)

(52) U.S. Cl. .................. 379/406.08; 379/406.01; 379/406.07; 379/406.11

(58) Field of Classification Search .................. 379/406.01–406.16
See application file for complete search history.

(56) References Cited

U.S. PATENT DOCUMENTS

| | | | |
|---|---|---|---|
| 3,991,287 A | | 11/1976 | May, Jr. et al. |
| 4,243,959 A | | 1/1981 | Duttweiler |
| 5,295,136 A | * | 3/1994 | Ashley et al. .............. 370/290 |
| 5,535,194 A | * | 7/1996 | Ashley et al. .............. 370/289 |
| 6,282,176 B1 | | 8/2001 | Hemkumar |
| 6,282,286 B1 | | 8/2001 | Reesor et al. |
| 6,347,140 B1 | * | 2/2002 | Tahernezhaadi et al. . 379/406.1 |
| 2002/0184013 A1 | | 12/2002 | Walker |

FOREIGN PATENT DOCUMENTS

| | | | |
|---|---|---|---|
| GB | 2 348 350 A | | 9/2000 |
| GB | 2348350 A | | 9/2000 |
| GB | 2348350 A | * | 9/2000 |
| GB | 2 367 467 A | | 4/2002 |

OTHER PUBLICATIONS

Gustafsson et al., "Combined Acoustic Echo Control and Noise Reductions for Hands Free Telephony," Signal Processing, vol. 64 Jan. 1998, pp. 21-32.
Martin, "Noise Power Spectral Density Estimation Based on Optimal Smoothing and Minimum Statistics," IEEE Transactions on Speech and Audio Processing, vol. 9, No. 5, Jul. 2001, pp. 504-512.

* cited by examiner

*Primary Examiner*—Ramnandan Singh
(74) *Attorney, Agent, or Firm*—Beyer Weaver LLP

(57) ABSTRACT

A method of suppressing an echo signal in a communication path such as acoustic coupling between a speaker and a microphone in a telephone device handset includes the steps of monitoring a transmitted signal supplied to the communication path to determine an attribute thereof; generating a leaky mask based on the determined attribute and an attribute of a received echo signal; and partially cancelling the received echo signal using the leaky mask.

26 Claims, 2 Drawing Sheets

ECHO CANCELLATION/SUPPRESSION AND DOUBLE-TALK DETECTION IN COMMUNICATION PATHS

FIELD OF THE INVENTION

The present invention relates generally to telecommunications and in particular to echo cancellation/suppression and double-talk detection in communication paths.

BACKGROUND OF THE INVENTION

Acoustic coupling in telephone device handsets is common and occurs when signals broadcast by the speaker of a telephone device are coupled to the microphone of the same telephone device. This acoustic coupling causes echo signals in the network over which the communication channel is established. The acoustic suppression of signals broadcast by the handset speaker before they are picked up by the handset microphone is variable and depends on a number of factors, such as for example, the pressure exerted on the user's ear by the handset speaker and how well the handset speaker seals the user's ear. The loss in power of these signals as a result of acoustic suppression can vary from about −50 db to as low as −24 db when the telephone device handset is placed on a hard surface. If delays in the network are short (i.e. 30 ms), the normal acoustic suppression of signals broadcast by the handset speaker is generally sufficient to inhibit voice quality from being noticeably degraded by echo signals picked up by the handset microphone. However, if the delays in the network are significant, echo signals in the network due to acoustic coupling will noticeably degrade voice quality over the communication channel. As such, suppressing echo signals resulting from acoustic coupling in telephone devices is important.

Echo cancellers in telephone devices have been considered. A typical echo canceller attempts to model the transfer function of the echo signal path using a linear algorithm such as a Least-Mean-Squared (LMS) algorithm. The estimated echo signals generated by the echo canceller are subtracted from the echo signals picked up by the handset microphone. Differences between the estimated echo signals and the actual echo signals result in error signals, which are fed back to the echo canceller. Unfortunately, since the algorithm executed by the echo canceller is linear, the echo canceller cannot deal with non-linear effects and can only converge to a transfer function that approximates the echo signals. As a result, residual echo signals propagate through the echo canceller to the network.

To deal with the deficiencies noted above, an echo suppressor has been considered and is described in U.K. Patent Application Serial No. 9907102.9 filed on Mar. 26, 1999. This echo suppressor includes a power level calculator that determines the power level of signals broadcast by the handset speaker. A mask generator is responsive to the power level calculator and generates masks that are a function of the determined power levels to suppress echo signals received by the handset microphone. To avoid noticeable switching effects in the presence of background noise, the echo suppressor can be conditioned to generate leaky masks. This is achieved by setting one or a few of the least significant bits (LSBs) in the masks to one (1) so that the lower bits of the received echo signals are leaked through the echo suppressor.

Although this echo suppressor works well to suppress echo, since the number of least significant bits in the masks that are set to one to leak echo signals is static, switching effects that degrade voice quality still result. Also, since the echo suppressor is active all the time with the number of zeros in the masks changing depending on the power level of the signals broadcast by the handset speaker, the echo suppressor degrades speech quality during double-talk situations. As will be appreciated, improvements in echo cancellation/suppression are desired.

It is therefore an object of the present invention to provide a novel echo suppressor and method for suppressing echoes in a communication path.

SUMMARY OF THE INVENTION

According to one aspect of the present invention there is provided a method of suppressing an echo signal in a communication path comprising the steps of:

monitoring a transmitted signal supplied to said communication path to determine an attribute thereof;

generating a leaky mask based on said determined attribute and an attribute of a received echo signal; and partially cancelling said received echo signal using said leaky mask Preferably, the attribute of the transmitted signal is the power level thereof and the attribute of the received echo signal is the noise level thereof. In the preferred embodiment, the generating includes the steps of generating a suppression mask based on the power level of the transmitted signal; generating noise leaking bits based on the noise level of the received echo signal; and combining the suppression mask and the noise leaking bits to yield the leaky mask.

It is also preferred that the partially cancelling of step is inhibited in the presence of double-talk. Double-talk is declared when the power level of the received echo signal exceeds a threshold value.

In another embodiment, it is preferred that during the generating, an estimated echo signal is also generated based on the power level of the transmitted signal and that the partially cancelling step is performed after the estimated echo signal is subtracted from the received echo signal.

According to another aspect of the present there is provided an echo suppressor to suppress an echo signal in a communication path comprising:

a power level calculator determining the power level of a transmitted signal supplied to said communication path; and a mask generator responsive to said power level calculator and generating a leaky mask, said leaky mask being generated as a function of the determined power level and the noise level of a received echo signal, said leaky mask being applied to the received echo signal thereby to suppress partially said received echo signal.

According to yet another aspect of the present invention there is provided an echo suppressor to suppress an echo signal in a communication path comprising:

a digital signal processor for determining the power level of a transmitted signal supplied to said communication path and for determining the noise level of a received echo signal, said digital signal processor generating a leaky mask based on the determined power level and the determined noise level; and a multiplier for combining said leaky mask and said received echo signal thereby to suppress partially said received echo signal.

According to still yet another aspect of the present invention there is provided in a telephone device including a handset having a speaker to broadcast incoming signals and a microphone to receive outgoing signals, an echo suppressor to suppress echo signals picked up by the microphone as a result of acoustic coupling between said speaker and microphone comprising:

a power level calculator determining the power level of transmitted signals supplied to said communication path; and a mask generator responsive to said power level calculator and generating leaky masks, said leaky masks being generated as a function of the determined power level and the noise level of received echo signals, said leaky masks being applied to the received echo signals thereby to suppress partially said received echo signals.

According to still yet another aspect of the present invention there is provided an echo suppressor to suppress echo signals generated in a communication path comprising:

an echo canceller in parallel with said communication path, said echo canceller having a transfer function approximating that of said communication path and generating estimated echo signals in response to transmitted signals supplied to said communication path, said echo canceller subtracting said estimated echo signals from echo signals received from said communication path to generate residual echo error signals; and a processor receiving said estimated echo signals and said residual echo error signals, said processor determining the power level of the transmitted signals supplied to said communication path generating leaky masks, said leaky masks being generated as a function of the determined power level of said transmitted signals and the noise level of received echo signals, said leaky masks being applied to the residual echo error signals thereby to suppress partially said residual echo error signals.

The present invention provides advantages in that since the echo suppressor generates adaptive leaky masks, echo suppression is achieved while maintaining voice quality and avoiding switching effects in the presence of background noise. Also, since echo suppression is switched off in the presence of double-talk, voice quality is maintained in double-talk situations.

BRIEF DESCRIPTION OF THE DRAWINGS

Embodiments of the present invention will now be described more fully with reference to the accompanying drawings in which.

DETAILED DESCRIPTION OF THE PREFERRED EMBODIMENT

Figure 1:
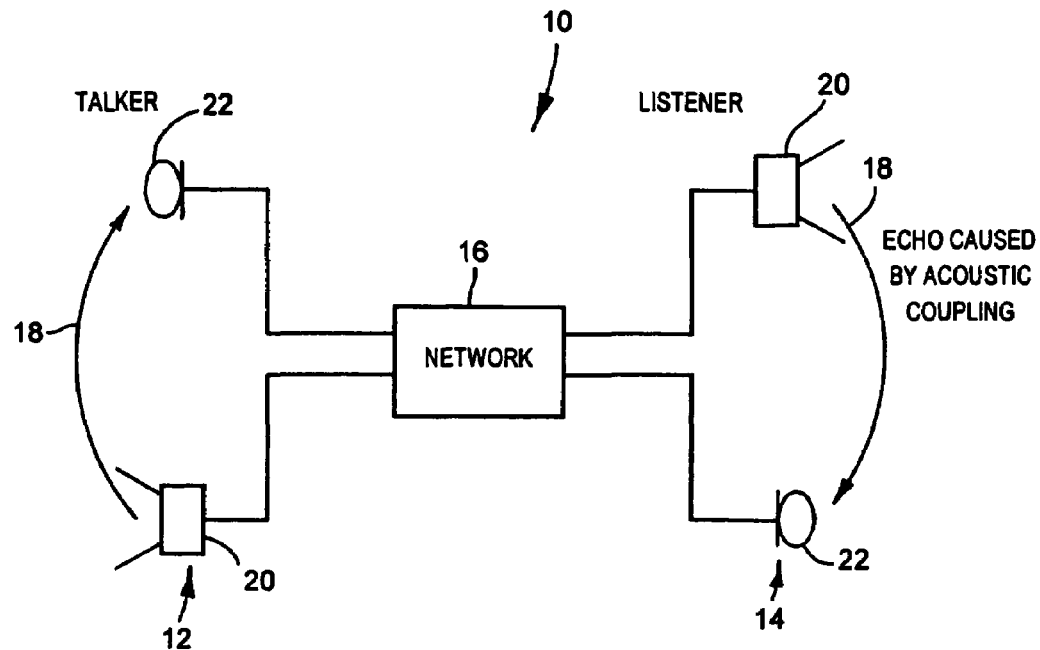
FIG. 1 is a schematic diagram of a communication channel established between a pair of telephone devices over a network showing acoustic coupling in one of the telephone devices.

Turning now to FIG. 1, a communication channel established between a pair of telephone devices 12 and 14 over a network 16 is shown and is generally identified by reference numeral 10. As can be seen, when a communication channel is established between the telephone devices 12 and 14, acoustic signals 18 broadcast by the handset speaker 20 of receiving telephone device 14 are acoustically coupled to the handset microphone 22 of the telephone device 14. The echo signals picked up by the handset microphone 22 as a result of the acoustic coupling cause echoes in the network 16, which degrade voice quality. If the delay in the network 16 is long, such as for example 150 ms, which may be caused by voice packetization and local area network (LAN) propagation delays, echoes in the network 16 as a result of the acoustic coupling become audible thereby detracting from voice quality.

Figure 2:
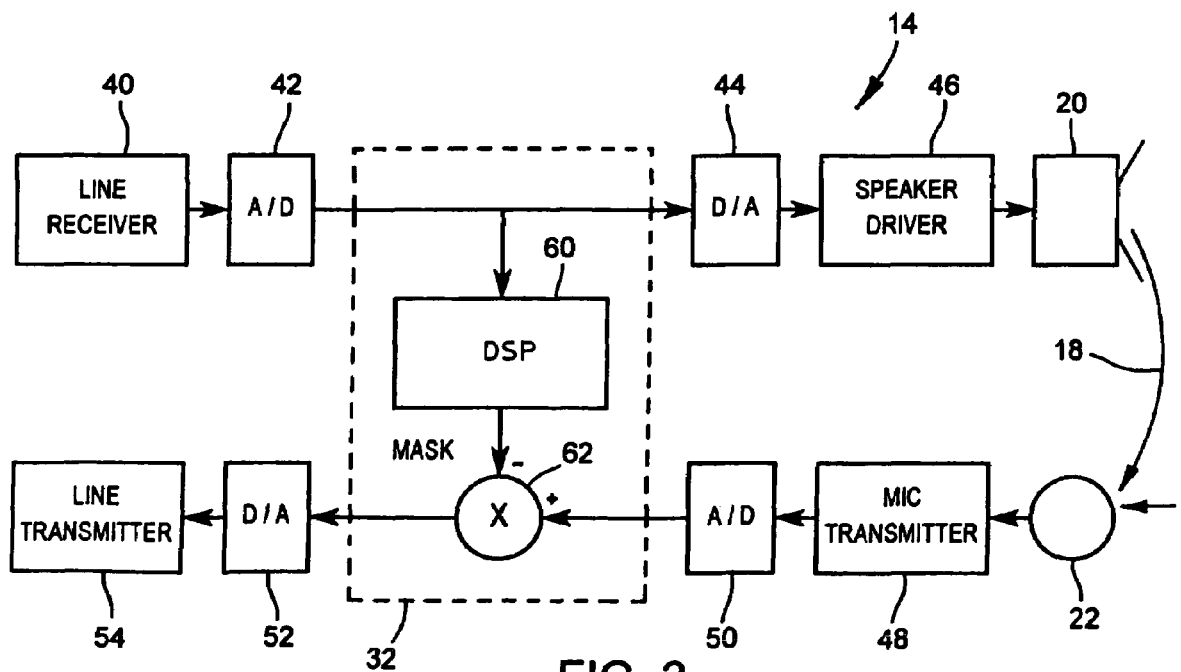
FIG. 2 is a schematic diagram of a telephone device including an echo suppressor in accordance with the present invention.

To suppress adaptively echo signals picked up by the handset microphone 22 as a result of acoustic coupling, an echo suppressor 32 in accordance with the present invention is provided in each of the telephone devices 12 and 14 respectively. FIG. 2 better illustrates telephone device 14. As can be seen, telephone device 14 includes a line receiver 40 coupled between the network 16 and an analog to digital converter 42. Analog to digital converter 42 provides digital output to the echo suppressor 32 and to a digital to analog converter 44. The digital to analog converter 44 conveys its analog output to a speaker driver 46, which amplifies the analog signals before they are broadcast by the handset speaker 20.

Coupled to the handset microphone 22 is a microphone receiver 48, which provides output to an analog to digital converter 50. Analog to digital converter 50 provides digital output to the echo suppressor 32. Echo suppressor 32 in turn supplies output to a digital to analog converter 52 that is coupled to the network 16 via a line transmitter 54.

The echo suppressor 32 couples the handset speaker 20 and the handset microphone 22 of the telephone device 14. The echo suppressor 32 adaptively masks echo signals picked up by the handset microphone 22 to inhibit echo in the network 16 using leaky masks to reduce switching effects in the presence of background noise. Specifically, the echo suppressor 32 generates suppressions mask based on the power level of signals broadcast by the handset speaker 20. This is due to the fact that typically, the larger the signals broadcast by the handset speaker 20, the larger the echo signals picked up by the handset microphone 22 as a result of acoustic coupling tend to be. The echo suppressor 32 also generates noise leaking least significant bits based on the noise level of the received echo signals that are needed to leak background noise through the echo suppressor 32. The suppression masks and the noise leaking LSBs are combined to yield echo suppression adaptive masks that are used by the echo suppressor 32 to suppress the received echo signals.

In addition, the echo suppressor 32 performs double-talk detection based on the power level of the received echo signals and the acoustic coupling loss between the handset speaker 20 and the handset microphone 22. When double-talk is declared, the bits of the adaptive masks generated by the echo suppressor 32 are all set to one (1) allowing the received echo signals to pass through the echo suppressor 32 unchanged.

In the present embodiment, the echo suppressor 32 is embodied in a programmable digital signal processor (DSP) 60. The DSP 60 executes an echo suppression algorithm, an echo signal noise level calculation algorithm and a double-talk detection algorithm to achieve the functionality described above. Further specifics concerning the echo suppression, echo signal noise level calculation and double-talk detection algorithms will now be described. During execution of the echo suppression algorithm, the DSP 60 performs a power level calculation to determine the power level of the signal received by the telephone device 14 that is to be broadcast by the handset speaker 20 and uses the determined power level to generate the suppression mask.

During execution of the echo signal noise level calculation routine, the DSP 60 calculates the noise level of the received echo signal using the method described in U.K. Patent Application Serial No. 0023975.6 filed on Sep. 30, 2000, the content of which is incorporated herein by reference. The value of the calculated echo signal-noise level is then used to determine the number of noise leaking bits required to leak effectively the background noise and avoid switching effects. The suppression mask and the noise leaking bits are then combined to yield the echo suppression adaptive mask.

More particularly, the level of echo signal is calculated based on the envelope of transmitted signal and echo suppression value using the formula:

$$\text{level(echo)}=\text{envelope(transmit\_signal)}/\text{acoustic\_coupling\_loss\_value (e.g. 24 dB)} \qquad (1)$$

The value for the mask is chosen based on the estimated echo signal level. The number of noise leaking bits is chosen based on the calculated level of background noise picked up by the microphone 22. For example, if the estimated echo signal level is equal to 256 ($2^8$), then the mask needed to completely suppress the echo will have 8 LSBs equal to zero (i.e. ECHO_MASK=0xFF00). If the value for the estimated noise is equal to 7, the number of bits needed to leak the noise through is 3, (i.e. NOISE_MASK=0x0007). The echo suppression adaptive mask is then calculated using the formula:

$$\text{MASK}=\text{ECHO\_MASK OR NOISE\_MASK} \qquad (2)$$

For the example given above the value of the mask is MASK=0xFF07.

During execution of the double-talk detection algorithm, the DSP 60 calculates the power level of the received echo signal and compares the calculated power level with a threshold value. The threshold value is a predefined factor of the expected echo signal level, based on the acoustic coupling loss value. In simple terms, double talk is declared whenever the signal received by the microphone 22 is bigger than the expected echo signal which, as discussed above, is equal to the envelope of transmitted signal divided by the acoustic coupling loss value. The expected echo signal level is determined from the power level of the signal broadcast by the handset speaker 20 and the value of the acoustic coupling loss between the handset speaker 20 and the handset microphone 22. The acoustic coupling loss is directly related to the acoustic properties of a given handset. It is basically always the same for a specific handset design and specific scenario/application, and has to be measured electrically or acoustically using lab equipment.

For example, a typical handset may be characterized by an acoustic coupling loss with the handset placed face-down on a hard desk, of −24 dB, and if the handset is sealed to the ear, the acoustic coupling loss is −50 dB. In the algorithm for implementing the preferred embodiment of the invention, a value of −24 dB is used, on the understanding that this value accommodates the worst-case scenario for the given handset. If the calculated echo signal power level is greater than the threshold value, double-talk is declared. When double-talk is declared, all of the bits of the adaptive mask are set to one (1). Appendix A shows pseudo-code representing the echo suppression, echo signal noise level calculation and double-talk detection algorithms executed by the DSP 60.

Once the echo suppression adaptive mask is established, the echo suppression adaptive mask is applied to the echo signal received by the handset microphone 22 via a multiplier 62. If double-talk has been declared, the echo suppressor 32 is effectively switched off allowing the echo signal to pass through the echo suppressor 32 unchanged. If double-talk has not been declared, the echo signal is cancelled or masked with the exception of background noise that is allowed to pass through the echo suppressor 32 as a result of the noise leaking bits.

Appendix B illustrates power level calculation and mask selection routines of the echo suppression algorithm used to calculate the power level of the signal broadcast by the handset speaker 20 and to select the appropriate suppression mask based on the calculated power level. During execution of the power level calculation routine, an envelope following the power level of the signal broadcast by the handset speaker 20 is generated using an infinite impulse response (IIR) lowpass filter. The IIR filter generates the envelope by estimating the long-range average of the absolute value of the signal broadcast by the handset speaker 20 and is of the form:

$$AbsY=(1-\text{alpha})AbsY+\text{alpha}*AbsY0 \qquad (3)$$

Y is the power level of the current monitored signal and Y0 is the power level of a previously monitored signal. Alpha is an IIR filter parameter and is chosen to provide a fast attack time and a slow decay time for the IIR filter. In the present embodiment, two different values for alpha are used, namely alpha_fast and alpha_slow depending on the power level of the signal broadcast by the handset speaker 20. Once the envelope has been generated, the DSP 60 selects the suppression mask in accordance with the mask selection routine.

Figure 3:
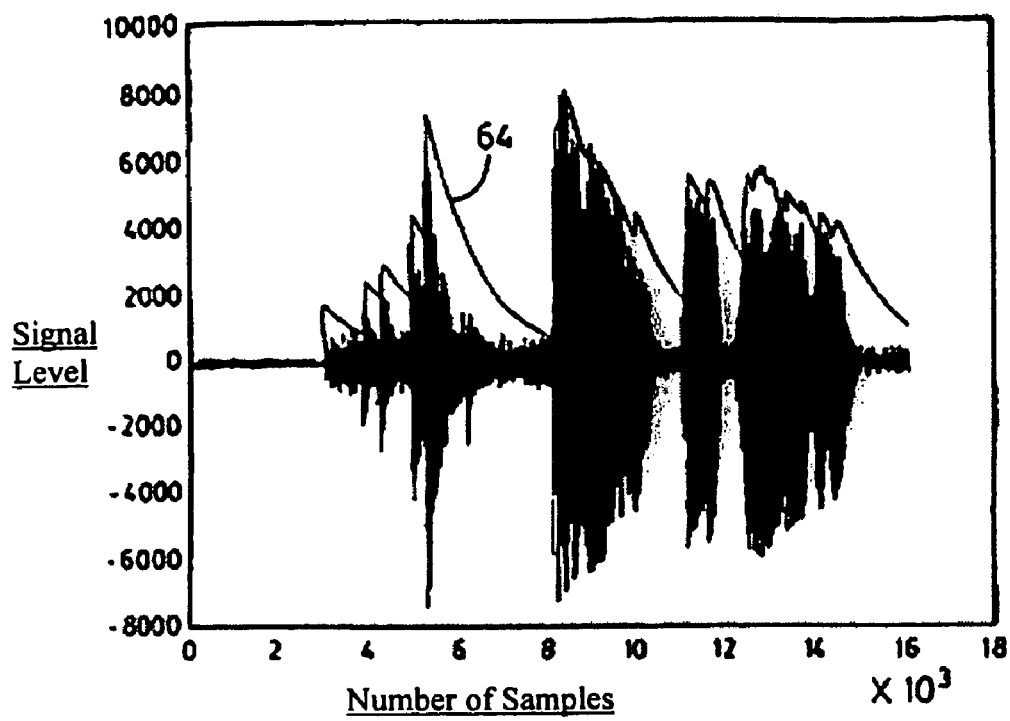
FIG. 3 is a graph showing an envelope calculated by the echo suppressor of FIG. 2 following the power level of a signal broadcast by a telephone device handset speaker.

FIG. 3 shows an example of an envelope 64 generated by the echo suppressor 32 in response to a signal broadcast by the handset speaker 20 where alpha_fast=1 and alpha_slow=$2^{-12}$. As will be appreciated, by choosing these values for alpha, the echo suppressor 32 generates an envelope that reacts fast to signals broadcast by the handset speaker 20. The slow decay time on the other hand compensates for small signal delays and reduces the switching effect when the signals fade.

If desired, the DSP 60 can take actual acoustic coupling between the handset speaker 20 and handset microphone 22 into account. In this case, as the envelope is generated, the DSP 60 calculates the value of the acoustic coupling loss between the handset speaker 20 and the handset microphone 22 based on the received echo signal and the measured acoustic coupling loss, as discussed above. After the value of the acoustic coupling loss has been calculated, the mask selection routine selects the suppression mask in accordance with the routine illustrated in Appendix B, from which it will be noted that suppression mask is calculated based on the level of expected echo, which is:

$$\text{level(echo)}=\text{envelope(transmit\_signal)}/\text{acoustic\_coupling\_loss\_value} \qquad (4)$$

Thus, a smaller acoustic coupling loss value results in a larger suppression mask.

Figure 4:
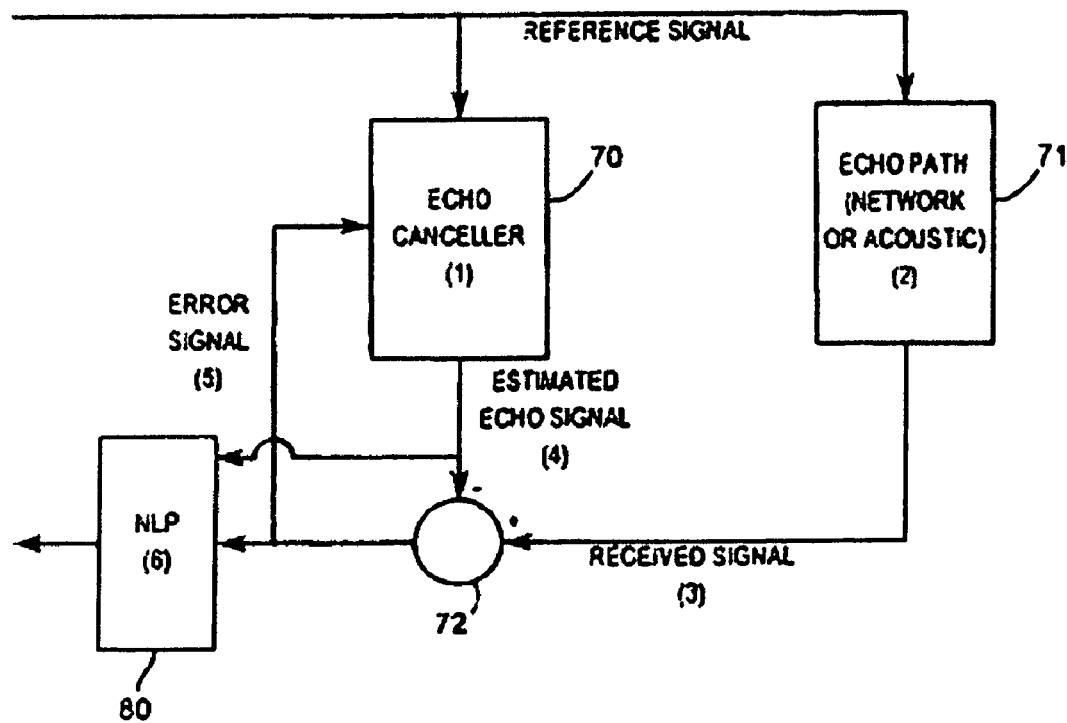
FIG. 4 is a schematic diagram of a conventional echo canceller and a non-linear processor to suppress residual echo signals in accordance with the present invention.

Turning now to FIG. 4, an alternative embodiment of the present invention is shown. In this embodiment, a conventional echo canceller 70 is in parallel with a communication path 71 in which echo signals are generated. The communication path 71 may be a telephone device handset as described in the previous embodiment. Alternatively, the communication path 71 may be a hands free telephone, a network which causes network reflections, or another source of echo signals. The echo canceller 70 attempts to model the transfer function of the echo signal path using a least-mean-squared (LMS) algorithm and generates estimated echo signals. The estimated echo signals are subtracted 72 from the echo signals received by the echo canceller 70 in an attempt to cancel the received echo signals. The amount of cancellation is commonly referred to as ERLE. Differences between the estimated echo signals and the received echo signals result in residual echo signals. The residual echo signals are fed back to the echo canceller 70 so that the echo canceller can attempt to converge to the correct transfer function.

Unfortunately, the LMS algorithm only monitors linear effects in the echo path. It does not deal with non-linear effects caused for example by, clipping, telephone key rattling, and frequency shift. Therefore, the echo canceller 70 converges to a transfer function that approximates the correct transfer function resulting in non-zero residual echo signals. These non-zero residual echo signals result in echo signals in the network.

To suppress the residual echo signals, a non-linear processor (NLP) 80 is provided and receives the estimated echo signals output by the echo canceller 70 as well as the residual echo signals output by the subtractor 72. The NLP 80 executes the echo suppression, echo signal noise level calculation and double-talk detection algorithms described previously. The leaky masks generated by the NLP 80 are combined with the residual echo signals to suppress the residual echoes with the exception of background noise which is allowed to pass through the NLP 80 as a result of the noise leaking bits.

Taking actual acoustic coupling into account is particularly of interest in this environment especially in situations where the existence of double-talk is indeterminate. The NLP 80 needs to be active only during the echo periods, and should be switched off during double-silence and double-talk periods. Since it is not a straightforward matter to correctly determine exactly when the NLP should be switched on, it is important to reduce the speech degradation in cases when the NLP 80 has been incorrectly switched on during periods of double-talk. Some NLP designs totally cut-off the signal when echo is present and replace the signal with regenerated noise or even silence. Obviously, if such an NLP is active when near end speech signal is present, instead of echo, the speech will be cut-off and distorted. According to the present invention, the large mask introduces more distortion to the speech than a smaller mask, because it clears more bits of information.

Although the preferred embodiment of the echo suppressor 32 is described with reference to a programmable DSP, those of skill in the art will appreciate that alternative implementations can be used. For example, the algorithms may be run on a hardware ASIC (i.e. a non-programmable digital processing device) or other comparable hardware device.

Although preferred embodiments of the present invention have been described, those of skill in the art will appreciate that variations and modifications may be made without departing from the spirit and scope thereof as defined by the appended claims.

APPENDIX A

```
Inputs: transmitted_signal(1), received_signal (2)
Output: output_signal going to the network (3)
Start:
Calculate the power of transmitted-signal;
AbsY = (1−alpha)AbsY + alpha*abs(transmitted_signal);
Chose the mask that corresponds to the power of the transmitted-signal;
Echo_Mask = Mask_select(AbsY, Acoustic_Coupling_Loss);
```

APPENDIX A-continued

```
Calculate the noise level of received-signal
noise_level = NoiseLevelCal(received_signal);
Noise_Mask =0;
while noise_level >0
    Noise_Mask =( Noise_Mask *2)+1;
    noise_level =fix(noise_level /2);
end
Mask = mask_combine(Echo_Mask, Noise_Mask);
/* Double-Talk calculation */
Calculate the power of the received signal;
AbsY_echo = (1−alpha)AbsY_echo + alpha*abs(received_signal);
if (AbsY/Acoustic_Coupling_Loss < AbsY_echo)
    dt=1; /* Double-talk is declared*/
else
    dt=0; /* Single-Talk (Echo) is declared*/
end
if (dt==1)
    Mask = 0xFFFF;
end
If received_signal is positive
Output_signal = received_signal AND Mask;
If received_signal is negative
Output_signal =−(abs(received_signal) AND Mask);
Go to Start;
where:
    transmitted_signal is the signal received by the telephone device
to be broadcast by the handset speaker;
    received_signal is the echo signal picked up by the handset
microphone;
    alpha is an IIR filter parameter; and
    Output_signal is the signal output to the network by the
telephone device.
```

APPENDIX B

Power Level Calculation Routine

```
if AbsY > AbsY0
    AbsY=(1− alpha_slow)*AbsY + alpha_slow *AbsY0;
else
    AbsY=(1− alpha_fast)*AbsY + alpha_fast *AbsY0;
end
```

Mask Selection Routine

```
Mask_select:
    Mask = 64512;         %fc00 or 10 zeros (1111110000000000)
    if AbsY < 4063
        Mask = 65024;     %fe00 or 9 zeros
    end
    if AbsY < 2031
        Mask = 65280;     %ff00 or 8 zeros
    end
    if AbsY < 1015
        Mask = 65408;     %ff80 or 7 zeros
    end
    if AbsY < 507
        Mask = 65472;     %ffc0 or 6 zeros
    end
    if AbsY < 253
        Mask = 65504;     %ffe0 or 5 zeros
    end
    if AbsY < 126
        Mask = 65520;     %fff0 or 4 zeros
    end
    if AbsY < 63
        Mask = 65528;     %fff8 or 3 zeros
    end
    if AbsY < 31
        Mask = 65532;     %fffc or 2 zeros
    end
    if AbsY< 15
        Mask = 65534;     %fffe or 1 zero
    end
```

What is claimed is:

1. A method of suppressing an echo signal in a communication path comprising the steps of:
    monitoring a transmitted signal supplied to said communication path to determine an attribute thereof;
    generating a leaky mask based on said determined attribute and an attribute of a received echo signal; and
    partially cancelling said received echo signal using said leaky mask,
    wherein the attribute of said transmitted signal is the power level thereof and the attribute of the received echo signal is the noise level thereof.

2. The method of claim 1 wherein said generating includes the steps of:
    generating a suppression mask based on the power level of said transmitted signal;
    generating noise leaking bits based on the noise level of said received echo signal; and
    combining said suppression mask and noise leaking bits to yield said leaky mask.

3. The method of claim 2 wherein during said generating an envelope of the power level of said transmitted signal is generated, said envelope being used to select said suppression mask.

4. The method of claim 3 wherein said envelope is generated by an infinite impulse response (IIR) lowpass filter.

5. The method of claim 4 wherein said IIR lowpass filter generates said envelope by solving the equation:

$$AbsY = (1-\text{alpha})AbsY + \text{alpha}*AbsY_0$$

where alpha is a parameter of said IIR filter, Y is the power level of said transmitted signal and Y0 is the power level of a previously transmitted signal.

6. The method of claim 1 further comprising the step of inhibiting said partial cancelling in the presence of double-talk.

7. The method of claim 6 wherein double-talk is declared when the power level of said received echo signal exceeds a threshold value.

8. The method of claim 1 wherein during said generating, an estimated echo signal is also generated based on the power level of said transmitted signal and wherein the partially cancelling step is performed after the estimated echo signal is subtracted from the received echo signal.

9. The method of claim 8 wherein said estimated echo signal is generated using a linear algorithm approximating the transfer function of said communication path.

10. The method of claim 8 further comprising the step of inhibiting said partial cancelling in the presence of double-talk.

11. The method of claim 10 wherein double-talk is declared when the power level of said received echo signal exceeds a threshold value.

12. An echo suppressor to suppress an echo signal in a communication path comprising:
    a power level calculator determining the power level of a transmitted signal supplied to said communication path; and
    a mask generator responsive to said power level calculator and generating a leaky mask, said leaky mask being generated as a function of the determined power level and the noise level of a received echo signal, said leaky mask being applied to the received echo signal thereby to suppress partially said received echo signal.

13. An echo suppressor according to claim 12 wherein said power level calculator generates an envelope following the power level of the transmitted signal.

14. An echo suppressor according to claim 13 wherein said power level calculator includes an infinite impulse response (IIR) lowpass filter to generate said envelope.

15. An echo suppressor according to claim 13 wherein said IIR lowpass filter generates said envelope by solving the equation:

$$AbsY = (1-\text{alpha})AbsY + \text{alpha}*AbsY_0$$

where alpha is a parameter of said IIR filter, Y is the power level of said transmitted signal and Y0 is the power level of a previously transmitted signal.

16. An echo suppressor according to claim 12 further including a double-talk detector to inhibit said mask generator in the presence of double-talk on said communication path.

17. An echo suppressor according to claim 16 wherein said double-talk detector inhibits said mask generator when the power level of said received echo signal exceeds a threshold value.

18. An echo suppressor to suppress an echo signal in a communication path comprising:
    a digital signal processor for determining the power level of a transmitted signal supplied to said communication path and for determining the noise level of a received echo signal, said digital signal processor generating a leaky mask based on the determined power level and the determined noise level; and
    a multiplier for combining said leaky mask and said received echo signal thereby to suppress partially said received echo signal.

19. An echo suppressor according to claim 18 wherein said digital signal processor conditions said leaky mask to a full pass state in the presence of double-talk on said communication path.

20. An echo suppressor according to claim 19 wherein said digital signal processor conditions said leaky mask to said full pass state when the power level of the received echo signal exceeds a threshold value.

21. In a telephone device including a handset having a speaker to broadcast incoming signals and a microphone to receive outgoing signals, an echo suppressor to suppress echo signals picked up by the microphone as a result of acoustic coupling between said speaker and microphone comprising:
    a power level calculator determining the power level of transmitted signals supplied to said communication path; and
    a mask generator responsive to said power level calculator and generating leaky masks, said leaky masks being generated as a function of the determined power level and the noise level of received echo signals, said leaky masks being applied to the received echo signals thereby to suppress partially said received echo signals.

22. An echo suppressor according to claim 21 further including a double-talk detector to inhibit said mask generator in the presence of double-talk on said communication path.

23. An echo suppressor according to claim 22 wherein said double-talk detector inhibits said mask generator when the power level of received echo signals exceed a threshold value.

24. An echo suppressor to suppress echo signals generated in a communication path comprising:
- an echo canceller in parallel with said communication path, said echo canceller having a transfer function approximating that of said communication path and generating estimated echo signals in response to transmitted signals supplied to said communication path, said echo canceller subtracting said estimated echo signals from echo signals received from said communication path to generate residual echo error signals; and
- a processor receiving said estimated echo signals and said residual echo error signals, said processor determining the power level of the transmitted signals supplied to said communication path and generating leaky masks, said leaky masks being generated as a function of the determined power level of said transmitted signals and the noise level of received echo signals, said leaky masks being applied to the residual echo error signals thereby to suppress partially said residual echo error signals.

25. An echo suppressor according to claim 24 further including a double-talk detector to inhibit said mask generator in the presence of double-talk on said communication path.

26. An echo suppressor according to claim 25 wherein said double-talk detector inhibits said mask generator when the power level of received echo signals exceed a threshold value.

* * * * *